United States Patent [19]

Cornelius

[11] 4,104,343
[45] Aug. 1, 1978

[54] DETECTING AND SORTING ABNORMAL ARTICLES DURING BLOW MOLDING

[75] Inventor: Harry C. Cornelius, East Granby, Conn.

[73] Assignee: Monsanto Company, St. Louis, Mo.

[21] Appl. No.: 774,618

[22] Filed: Mar. 4, 1977

[51] Int. Cl.² .............................................. B29C 17/07
[52] U.S. Cl. ..................................... 264/40.1; 264/94; 425/537
[58] Field of Search ............... 264/89, 94, 96–99, 264/40.1, 40.3; 425/139, DIG. 231, DIG. 232, 522, 537

[56] References Cited

U.S. PATENT DOCUMENTS

| | | | |
|---|---|---|---|
| 3,072,959 | 1/1963 | Leeds et al. ............................ | 425/139 |
| 3,255,716 | 6/1966 | Knoechel et al. ..................... | 264/40.4 |
| 3,374,887 | 3/1968 | Parvold ................................. | 209/73 |
| 3,577,291 | 5/1971 | Uchida ................................... | 264/94 X |
| 3,677,680 | 7/1972 | Etherington .......................... | 425/129 |
| 3,728,063 | 4/1973 | Langecker ........................... | 264/40.1 X |
| 4,042,657 | 8/1977 | Ostapchenko et al. .............. | 264/40.1 |

FOREIGN PATENT DOCUMENTS 2,213,013  10/1973  Fed. Rep. of Germany ........... 425/139

*Primary Examiner*—Jan H. Silbaugh
*Attorney, Agent, or Firm*—Michael J. Murphy

[57] ABSTRACT

In blow molding hollow articles from precursors at molding temperature by distention with fluid under pressure within the cavity of a blow mold, the pressure variation of such fluid beyond preselected limits as measured upstream of the cavity is used to create a signal to reject articles of abnormal quality from the acceptable article flow.

8 Claims, 2 Drawing Figures

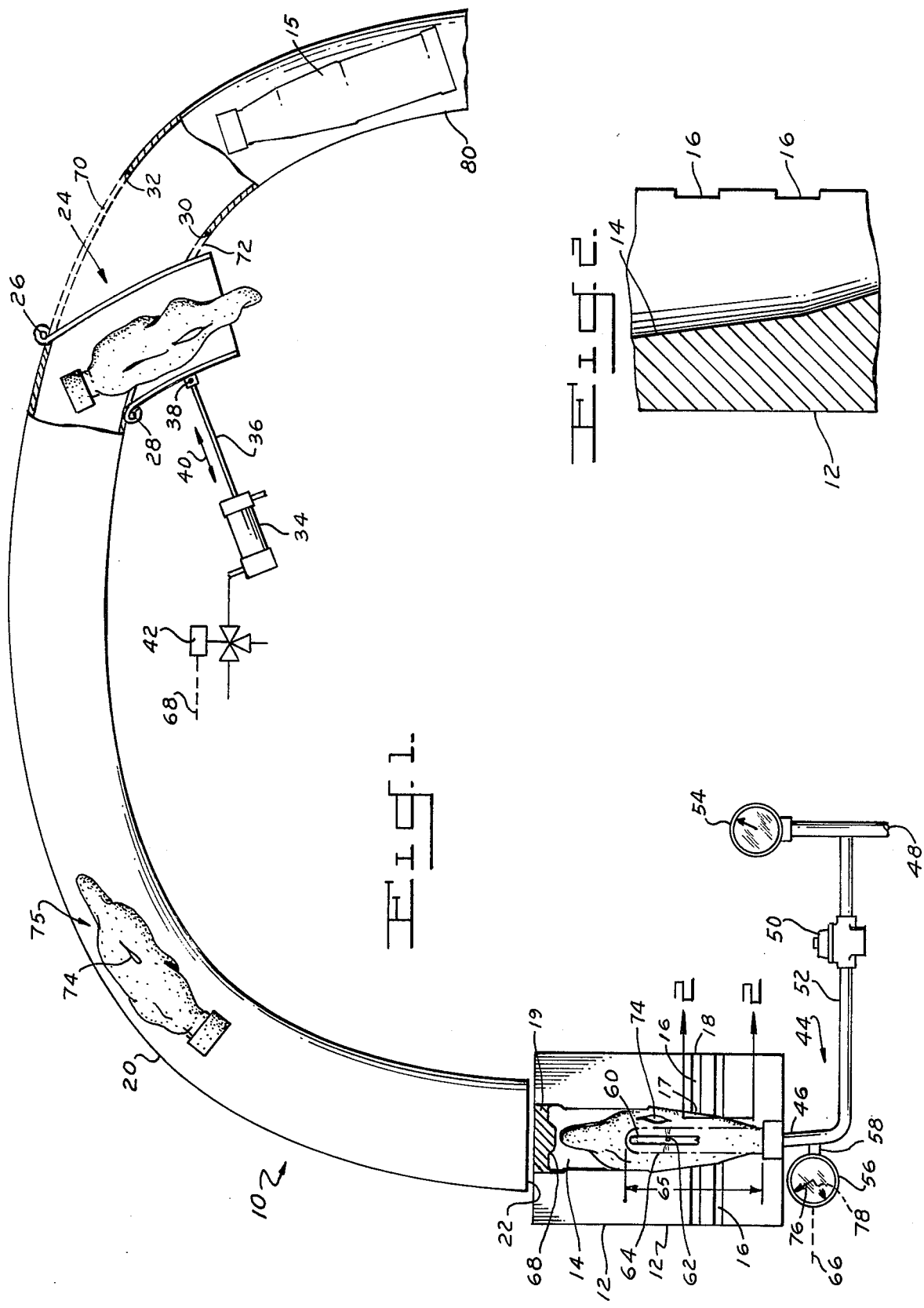

DETECTING AND SORTING ABNORMAL ARTICLES DURING BLOW MOLDING

BACKGROUND OF THE INVENTION

This invention relates to blow molding and more particularly to a shaping detection system for a blow mold.

Detecting systems are known for determining the quality of blow molded articles of thermoplastic material downstream of the molding station and for sorting abnormally formed articles from the stream of good quality products. Likewise disclosed in the prior art are detection systems within the mold cavity per se for sensing when parts formed in a previous cycle have not been faithfully removed and for initiating corrective action before loading the molding system for the start of the next cycle. As far as is known, however, no system existed prior to the present invention for detecting malformed parts coincident with their formation.

SUMMARY OF THE INVENTION

Now, however, an automated process has been developed for detecting the quality of hollow articles of thermoplastic material during formation in a blow mold.

Accordingly, it is a principal object of this invention to provide process improvements for contactless detecting and sorting of abnormal hollow articles during the blow molding thereof.

Another object is to provide such improvements, which avoid jamming of escapements and handling systems downstream of the blow mold.

Yet another object is to provide such improvements which do not rely on mechanical sensors within the mold cavity in contact with the formed article but rather function as an incident to the conventional forming operation per se.

A further object is to provide such process improvements which can be implemented with a simple system of reduced complexity readily installable on existing blow molding equipment.

An additional object is to provide process improvements for inspecting blown article quality within the forming mold while avoiding additional, complex inspection equipment downstream of the mold.

Other objects of this invention will in part be obvious and will in part appear from the following description and claims.

These and other objects are accomplished in the process of blow molding hollow articles which includes the step of distending precursors of thermoplastic material at molding temperature within the cavity of a blow mold with fluid under pressure, by providing the improvement comprising, in combination, sensing a variation in pressure of such fluid outside a predetermined limit upstream of the mold when an abnormal article of unacceptable quality is formed in the cavity from one of such precursors, and creating a signal in response to such variation to isolate such abnormal article from those of acceptable quality.

BRIEF DESCRIPTION OF THE DRAWING

In describing the overall invention, reference will be made to the accompanying drawing wherein:

FIG. 1 is a schematic view of a system employing the invention; and

FIG. 2 is a sectional view on an enlarged scale along 2—2 of FIG. 1.

DETAILED DESCRIPTION OF THE ILLUSTRATED EMBODIMENT

With reference to the accompanying drawing, a system collectively identified as 10 is shown in FIG. 1 for forming hollow articles such as containers in the form of bottles 15. System 10 includes a blow mold comprising a pair of separable sections, one being shown at 12, which when closed in conjunction with base section 19, circumscribe a mold cavity 14 conforming in surface contour to the outline of bottle 15. Section 19 is optional and may not be required when substantially flat-based articles are being molded — i.e. cavity end wall 68 may be an integral part of the separable section pair. A series of vent passages 16 are formed in the mold which communicate at 17 with cavity 14 and at 18 with the exterior of the mold per se. Passages 16 are exemplarily shown as extending substantially radial to the longitudinal axis of cavity 14 and formed (FIG. 2) in one separable section on the opening plane of the mold, but alternative dispositions may be used. Vent passages 16 which are on the order of about 0.005 inches deep in the direction perpendicular to the mold parting line permit displacement of residual atmospheric air trapped within cavity 14 after mold closing to the exterior of the mold by the expanding resilient plastic during formation of the article in a manner to be described. Blown article delivery means exemplarily comprising arched discharge chute assembly 20 is above the forming mold and has entrance opening 22 aligned with cavity 14. Chute 20 has an open inner cross section slightly greater than the peripheral contour of articles 15 and functions to receive such articles from the mold and via chute contour to guide them forwardly to a downstream receiving means where, for example, a finishing operation might be next performed thereon. Assembly 20 is equipped with an ejection or segregating mechanism 24 for abnormal articles in the form of a section of chute hinged at 26 and 28 and mounted for shifting movement from a normally maintained inactive position aligned at 30 and 32 with the path of movement of dimensionally accurate bottle 15, to an active downwardly displaced position blocking such movement. Such movement of mechanism 24 may be exemplarily caused by conventional fluid cylinder 34 and associated piston schematically illustrated at 36 joined at its forward end at 38 with the lower portion of hinged chute section 24. Via three-way solenoid valve 42, fluid under pressure is selectively conducted to and evacuated from opposite sides of cylinder 34 to cause piston 36 to move in the direction of arrows 40.

Conduit means 44 communicate at 46 with cavity 14 and at opposite end 48 with a source of fluid under positive pressure. Conventional regulator 50 is positioned in means 44 to maintain pressure constant on downstream side 52. Gage 54 is optional, but in accordance with the invention, adjustable, pressure-responsive signal generating means 56 is arranged locally to sense fluid pressure just before the mold cavity via tie-in communication at 58 with conduit means 44. A hollow stretch rod schematically shown at 60 may be used and, via a conventional flexible connection, not shown, may communicate at 46 with conduit means 44 to act as the means for introducing fluid pressure to the interior of precursor 64 via plural openings 62 conventionally formed therein. The pressure-responsive signal generatig means is in the form of a pressure switch in the illustrated embodiment with an indicating dial and electrical contacts which can be preset to make or break at predetermined pressure limits, and which, as schematically shown by dotted lines 66 and 68, is electrically coupled with conventional time delay mechanisms, not shown, with on-off solenoid valve 42.

In operation, tubular precursors 64 formed of thermoplastic material are successively individually disposed either manually or automatically within cavity 14 of the closed blow mold and, in the illustrated embodiment, over the projecting end of stretch rod 60. Such precursors at this point in the cycle are malleable since at an elevated molding temperature which, at least in a major portion thereof such as body section 65, is preferably that whereat molecular orientation of the thermoplastic materials occurs on stretching, i.e. for product application where after mold cooling the walls of the blown article are intended to be stressed for strength purposes. The invention is especially suitable with materials at such temperatures since the frequency of forming malformed parts during blowing is more pronounced under such conditions than, for example, when the thermoplastic material is at the higher, more conventional extrusion or just below injection molding temperatures whereat the material is more plastic and readily moldable under pressure. This increased incidence occurs because the precursors usually will have just been treated in an upstream temperature influencing step to bring them within the molecular orientation temperature range of the thermoplastic material, and frequently the actual versus desired temperature profile will not quite be identical since one portion intended to be at the same temperature as another will in fact not be with the result that the hotter of the two blows first and forms an undesirable hole in the wall of the article. Next in the sequence of forming steps, stretch rod 60, when used, is actuated by any suitable mechanism, not shown, and thereby caused to advance linearly further into the precursor 64 in conventional manner so as to press against the inner surface of its closed end and stretch it axially until the outer surface of such end bears against end wall 68 of the mold cavity. Fluid such as air under a pressure of between about 50 to 250 psi is the introduced to the precursor through conduit means 44 and openings 62 in rod 60 to radially distend the axially stretched precursor outwardly against the walls of the mold cavity into the form of bottle 15. During the radial expanding step (which may optionally occur simultaneously with axial stretching), residual ambient air within cavity 14 exits the mold via vent passages 16. Container 15 is removed upwardly from the cavity via a short burst of air through ports 62 timed to occur after separation of the mold sections which propels or ejects the bottle into chute 20. The contour of the latter plus the force of the air pressure and the dotted line 70, 72 position of hinged section 24 then directs such accurately formed container 15 to the next downstream station, not shown, beyond exit end 80. During blowing of bottle 15, if a portion of precursor body section 65 happens to be slightly hotter than another portion of the same thickness due, for example, to uneven exposure to a heat source in an upstream treating station, such slightly hotter portion preferentially blows first and most likely will undesirably form a hole schematically illustrated in elongated form at 74 before the thermoplastic material of the precursor body reaches the adjacent walls of the mold cavity, and this results in formation of a hole-containing, abnormal, malformed part or article 75 of unacceptable quality. In accordance with the invention, when this occurs, or when any shape aperture is undesirably created during the blowing step, for example a crack in the vicinity of the finish adjacent the open end of the precursor, the pressurized fluid immediately leaks through hole 74 and vent passages 16 to the exterior of the mold and as a result of such leakage the pressure upstream of the mold typically drops by about 5 to 30 psi, for example from a level schematically shown at 76 to that shown at 78 on the dial of switch 56. This decline is sensed by switch 56 and a signal is generated in response thereto via connections 66 and 68 to immediately actuate valve 42 and thereby displace hinged portion 24 downwardly to the solid line position of FIG. 1 for a time interval set by a conventional time delay mechanism, not shown, sufficient to allow such abnormally formed article to pass through section 24 whereupon its upper inactive position is re-established. When such article 75 is thereafter ejected and reaches portion 24 as a result of the blocking position of the latter disposed in the trajector of article 75, it will be isolated and routed to a disposal or collection area or equivalent which is different from that to which dimensionally acceptable containers are directed beyond exit and 80 of chute 20.

The previous description and particularly the drawing are set forth for purposes of illustration only and are not to be taken in a limited sense.

Though the invention is especially suitable for use with precursors previously shaped in a molding step and then brought to molecular orientation temperature, it may also be used with other forms of precursors such as those at higher temperatures and which accordingly require lower blowing pressures, and where stresses therefore are not present to any substantial extent in the blown article. For example, usable with the invention are precursors of thermoplastic material in the form of: (a) extruded hollow tubular parisons at conventional extrusion melt temperatures; or (b) injection molded preforms in which the plastic, e.g. close to the outer surface, is only partially set and which are to be immediately reshaped to final form in a blow mold; or (c) partially completed blanks about to be expanded within a female cavity in a thermoforming system after having been initially drawn from sheet material at extrusion temperature by an advancing plug member.

Any form of means sensitive to a variation within preset limits of fluid blow pressure upstream of the mold cavity and capable of generating a signal in response to such variation may be used with the invention. Members actuatable either electrically, hydraulically, mechanically or via combinations thereof are equally effective. Likewise any form of means may be used to remove articles in any direction from the forming cavity of the mold as long as an arrangement is included which can be programmed to respond to the signal from the pressure detecting member to segregate the dimensionally accurate from the abnormally formed articles. Since ejection by positive air pressure substantially always functions successfully to remove any article from the mold cavity regardless of quality, this approach is preferred. Though the invention is most adapted to distinguish abnormal, hole-containing articles, it may also be used effectively to reject products without blowouts in the walls, for example those blown at pressures which have dropped below a preset level for some upstream-related reason such that the desired sharpness of detail cannot be obtained in the article being blown from a precursor at difficultly formable molecular orientation temperatures. Or for that matter, pressure dropoff adequate to set off the segregating mechanism without blowing a hole in the article might even occur due to a poor seal between the mold and wall around the open end of the precursor into which the blow fluid is admitted.

The invention may be used with any generic type of blow molding equipment, employing either single or multiple cavity molds. Usable, for example, are platen systems wherein plural cavities exist side by side in molds carried on a pair of opposing support platens cyclically actuated toward and away from each other; or continuously or intermittently movable horizontally oriented table or vertically disposed wheel systems each of which supports plural mold stations situated around the periphery thereof. In these latter types of systems, flexible connections to accommodate mold movement and time delay schemes to accommodate eject at a central removal location may be employed with the invention as necessary. For successful application of the invention from the standpoint of detection, it is only necessary that one pressure responsive signal generating means be employed per mold cavity.

Various modifications and alterations will be readily suggested to persons skilled in the art. It is intended, therefore, that the foregoing be considered as exemplary only and that the scope of the invention be ascertained from the following claims.

What is claimed is:

1. In the process of blow molding hollow articles which includes the step of:
   distending precursors of thermoplastic material at molding temperature within the cavity of a blow mold with fluid under pressure while venting residual air within said cavity to the exterior of said mold;
   the improvement which comprises, in combination:
   sensing a variation in pressure of said fluid outside a predetermined limit upstream of the mold during said distending when an abnormal article of unacceptable quality is formed in said cavity from one of such precursors; and
   creating a signal in response to said variation to isolate said abnormal article from those of acceptable quality.

2. The process of claim 1 wherein an undesirable hole is formed in said abnormal article during distending.

3. The process of claim 1 wherein at least major portions of said precursors are at molecular orientation temperature.

4. The process of claim 1 wherein said abnormal article is ejected upwardly from the cavity by said fluid under pressure.

5. The process of claim 1 wherein said variation is between about 5 to 30 p.s.i.

6. In the process of blowing hollow articles which comprises:
   disposing malleable precursors formed of thermoplastic material within the cavity of a closed blow mold having a passage for exhausting the cavity of residual air to the mold exterior;
   introducing fluid under pressure within said precursors to expand them against the cavity walls into the form of said articles; and
   ejecting the articles from the mold;
   the improvement occurring during blowing of abnormal parts having undesirable holes therein instead of said articles which comprises:
   sensing the decline in pressure of said fluid during introduction to said precursors due to its exiting from within said parts through said holes and passage; and
   creating a signal in response to said decline responsible for said parts after exiting said cavity proceeding to a collection area different from that toward which said articles are directed.

7. In the process of forming molecularly oriented containers which comprises:
   disposing tubular precursors formed of thermoplastic material having body sections within molecular orientation temperature range in the cavity of a closed blow mold have vent passages between said cavity and the mold exterior;
   distending said precursors by blowing radially against the walls of said cavity into the form of said containers with fluid under pressure; and
   removing said containers from the mold;
   the improvement occurring during blowing of articles from precursors having portions of said body sections within said range yet slightly hotter than other portions which are also within such range, thereby undesirably forming holes in said hotter portions before the thermoplastic material reaches the walls of the mold cavity, which improvement comprises:
   sensing the decline in pressure of said fluid upstream of the mold during introduction to said precursors as a result of its leakage through said holes and vent passages to the exterior thereof;
   generating a signal in response to said decline; and
   routing said hole-containing articles in response to said signal to an area different from that for said containers.

8. The process of claim 7 wherein the pressure of said fluid immediately upstream of the mold during blowing is between about 50 and 250 p.s.i.

* * * * *